(12) United States Patent
Myers et al.

(10) Patent No.: US 7,557,686 B2
(45) Date of Patent: Jul. 7, 2009

(54) COILS FOR ELECTRICAL MACHINES

(75) Inventors: Timothy M S Myers, Newcastle upon Tyne (GB); Kenneth S Gilmour, Long Eaton (GB); Stephen M Husband, Derby (GB)

(73) Assignee: Rolls-Royce PLC, London (GB)

( * ) Notice: Subject to any disclaimer, the term of this patent is extended or adjusted under 35 U.S.C. 154(b) by 477 days.

(21) Appl. No.: 11/405,507

(22) Filed: Apr. 18, 2006

(65) Prior Publication Data

US 2006/0181387 A1      Aug. 17, 2006

Related U.S. Application Data

(62) Division of application No. 11/013,967, filed on Dec. 17, 2004, now Pat. No. 7,061,362.

(30) Foreign Application Priority Data

Dec. 18, 2003    (GB)    ................................ 0329387.5

(51) Int. Cl.
*H01F 27/06*    (2006.01)
(52) U.S. Cl. ....................................................... 336/65

(58) Field of Classification Search .................... 336/65, 336/198; 29/602.1, 605, 603.23–26, 618, 29/894.2
See application file for complete search history.

(56) References Cited

U.S. PATENT DOCUMENTS 4,549,583 A * 10/1985 Orikasa ..................... 140/92.1

FOREIGN PATENT DOCUMENTS

| JP | 61004205 A | * | 1/1986 |
| JP | 04241403 A | * | 8/1992 |

* cited by examiner

*Primary Examiner*—Tuyen T. Nguyen
(74) *Attorney, Agent, or Firm*—Jeffrey S. Melcher; Manelli Denison & Selter PLLC

(57) ABSTRACT

A jig (10) is used to form a coil (50) for an electrical machine. A plurality of conductive wires (56), each covered in a heat-curable electrically insulated material, are wound around a bobbin (12). Each succeeding winding in contra-wound relative to the previous winding, with the first turn (16) of each succeeding winding overlaying the last turn (5) of the previous winding. Undeformable electrically insulated inserts (54) are inserted into the windings before heating and compressing the coil (50) in the jig (10).

5 Claims, 4 Drawing Sheets

Wire Area
Section Through Leadout
Connection Cross Section

COILS FOR ELECTRICAL MACHINES

TITLE OF THE INVENTION

This is a divisional of National application Ser. No. 11/013,967 filed Dec. 17, 2004 now U.S. Pat. No. 7,061,362.

FIELD OF THE INVENTION

The present invention relates to the manufacture of coils for electrical machines. It is particularly, but not exclusively, related to: methods of manufacturing coils; apparatuses for manufacturing coils; and the coils themselves.

BACKGROUND OF THE INVENTION

In several applications there is a demand for accurately manufactured solenoidal coils, which have high mechanical and electrical integrity.

This demand exists, for example, in transverse flux motors (TFMs), which are permanent magnet machines under development for ship propulsion.

In contrast to the geometrically complex electrical stator windings of conventional motors, a TFM has a simple solenoidal (i.e. substantially circular) coil. Although this shape is simple geometrically, its manufacture and operation at high voltages require new manufacturing and installation techniques.

The space available for the coil in the overall TFM is generally limited, and therefore the coil dimensions must be tightly controlled. Attention must also be paid to the means of connecting the coil to the power supply, in order to effect a reliable connection, which requires minimum space to take the electrical connection through the machine structure to the external motor terminals.

For all solenoid-type coils, electrical integrity is important. A TFM typically operates at around 3 kV and is normally driven by a pulse width modulated inverter that switches at high speeds (several kHz). The fundamental frequency of the motor at full speed can be around 200 Hz. Together these factors result in an arduous electrical duty and require a coil design which should reduce voltage stress within the coil windings and eliminate corona discharge, factors which could result in premature coil failure in use.

Operation of electrical coils at high voltage and high switching rates such as those encountered when using inverter based drives places significant demands on the coils. Previous machines have suffered insulation failure as a result of corona discharge and high dV/dt between adjacent windings and between the first and second turns in each winding.

Good manufacturing techniques can mitigate or even avoid these effects. Such techniques include pressing and curing the conductors or wires of the coil, which are usually pre-wrapped with epoxy-loaded tape; avoiding air voids in the insulation system and the application of a semiconductive ground plane wrap on the outside of the coil. A function of the ground wrap is to provide a defined high resistance leakage path for leakage currents which pass through the conductor insulation, avoiding charging of the outer coil surface to a high voltage which would otherwise lead to corona or arcing discharge to ground and damage to the insulation.

These techniques have been employed previously on conventional stator coils, which have long straight sections of conductor or wire which are ultimately located in stator slots. Means of applying the necessary compression to such sections of coil during the manufacturing process are well established for these conventional coils.

SUMMARY OF THE INVENTION

At its broadest, the present invention therefore provides new methods of manufacturing coils and new apparatuses for use in the manufacture of the coils. In particular the coils may be stator coils for transverse flux motors.

A method of forming a coil for an electrical machine, the method comprising the steps of: providing a plurality of conductive wires, each wire being covered in heat-curable electrically insulating material, successively winding the conductive wires around a bobbin to form concentric coil windings, each winding comprising the turns of the respective wire, and heating and compressing the coil to cure the insulating material, wherein substantially undeformable electrically insulating inserts are incorporated into the windings before the heating and compressing step.

The substantially undeformable inserts may prevent crushing of the insulating material, e.g. in the region of substantially rigid, conductive lead-outs. Alternatively or additionally the inserts may provide an insulating filler material at turning crossovers (where the turns of a winding having a plurality of concentric cylindrical layers start to come back on themselves) to help reduce or eliminate voids in the compressed coil, particularly at these positions.

The method may also include the step of terminating the first and last turns of each wire with substantially rigid conductive lead-outs, the insulating inserts being incorporated adjacent the lead-outs so as to guide the succeeding turn to each first turn and the preceding turn to each last turn past the lead-outs.

Another aspect of the present invention provides a method comprising the steps of: providing a plurality of conductive wires, each wire being covered in heat-curable electrical insulating material, successively winding the conductive wires around a bobbin to form concentric coil windings, each winding comprising the turns of a respective wire, terminating the start and end turns of each wire in substantially rigid conductive lead-outs, and heating and compressing the coil to cure the insulating material, wherein each lead-out is sized at its connection with the respective wire to substantially prevent a bulge or depression forming radially outwardly of the connection in the cured coil.

Furthermore, in each of these aspects, each lead-out may be covered in heat-curable insulating material at its connection with the respective wire.

A further aspect of the present invention provides a method of forming a coil for an electrical machine, the method comprising the steps of: providing one or more conductive wires, the or each wire being covered in heat-curable insulating material, winding the or each conductive wire around a bobbin to form a coil winding comprising turns of the respective wire, and heating the coil under axial and radial compression to cure the insulating material covering non-straight sections of the or each wire.

Each of the methods of the above aspects may also include the steps of: applying further heat-curable insulating material to the surface of the heat-treated coil, and reheating the coil under axial and radial compression to cure the further insulating material.

A further aspect of the present invention provides a coil winding jig comprising: a bobbin having a winding surface onto which a coil is windable, axial compression means for axially compressing non-straight section or sections of the coil, and radial compression means for radially compressing non-straight section or sections of the coil.

The winding jig of this aspect can carry out the compression of electrically insulating material at non-straight sections of a coil, such as a circular coil. This allows voids in the insulating material at such sections to be reduced or eliminated, so that the voltages which can be carried by the coil can be increased.

The winding jig of this aspect may also allow the coil to be manufactured such that its final dimensions are precisely defined, thereby allowing the coil to fit in the allocated space in a machine, such as a TFM.

Preferably the bobbin has a substantially circularly cylindrical winding surface, thereby defining a circular coil.

A radial dimension of the bobbin may be adjustable to facilitate removal of the coil from the bobbin.

The axial compression means may comprise axially spaced side plates to the bobbin, whereby the end faces of the coil can be pressed between the side plates.

In some embodiments, at least one of the side plates may have recesses for accommodating lead-outs from the coil.

The radial compression means may comprise a plurality of compression segments which are positionable around the circumference of the bobbin, whereby the coil can be pressed between the compression segments and the winding surface of the bobbin.

The coil winding jig may further comprise heating means for heating the coil. In this way the insulating material of the coil can be cured under simultaneous heat and pressure, without the need, for example, for an external heat source.

The winding jig of this aspect may be used for the manufacture of the coils of the aspects described above, or in the methods of forming coils of the aspects described above. The jig may have further features for use in such manufacture or methods.

All the above aspects of the present invention may allow construction of suitable coils for use in TFMs or other machine types, thereby making these motors practical.

BRIEF DESCRIPTION OF THE DRAWINGS

Embodiments of the present invention will now be described in relation to the accompanying figures, in which.

DETAILED DESCRIPTION OF THE INVENTION

Figure 1:
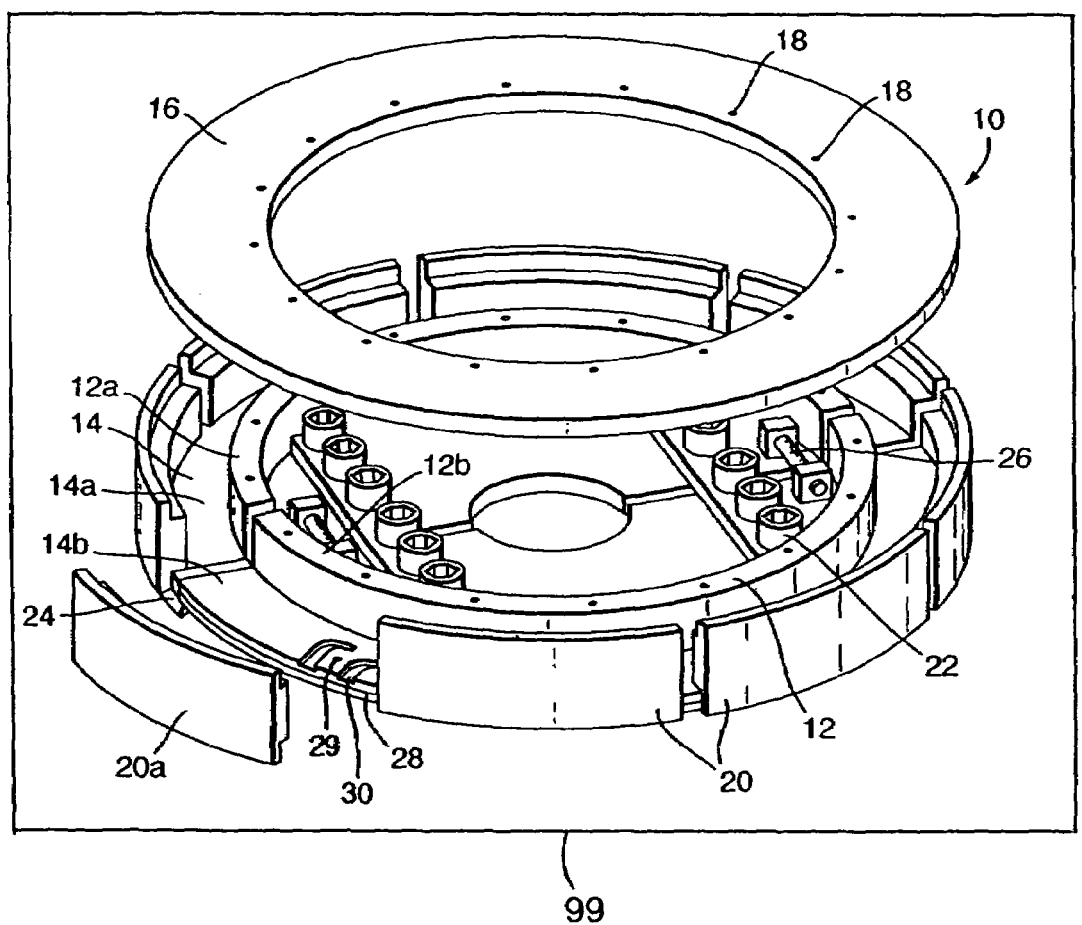
FIG. 1 shows a winding jig according to an embodiment of the present invention.

FIG. 1 shows a winding jig 10 according to an embodiment of the present invention. The jig 10 has a substantially cylindrical bobbin 12 onto which a coil can be wound, the bobbin being connected to a substantially circular or annular lower side plate 14.

In this description the terms "upper" and "lower" will be used as labels for parts of the jig 10 and coil with reference to the view of FIG. 1. However such terms are not to be considered to limit the jig 10 or a coil to being in those orientations and may be interchanged as appropriate.

A substantially circular or annular upper side plate 16 forms the second part of the jig 10, and can be attached to the bobbin by bolts through holes 18. The fourth "side" of the jig is provided by a set of circumferentially spaced outer compression segments 20 shown in their attached position, one of these segments (20a) being shown in a removed position.

The lower side plate 14 and bobbin 12 are divided into two halves 14a and 14b and 12a and 12b along a diameter. These halves can be moved relative to one another to allow a coil to be removed from or placed on the bobbin. These halves 14a and 14b and 12a and 12b are held together in use by two bolted bars 22, which have a number of holes through which dowels can be placed to set the two halves in an accurate relation to each other. Any gap in the lower side plate 14 which is present when the two halves are separated is filled by removable filler elements 24 in the region radially outwards of the bobbin 12, where the coil windings are placed, in order to make the plate surface continuous and avoid bulges in the finished coil.

Two jacking devices 26 are provided between the two halves 14a and 14b to allow them to be easily moved relative to each other when required.

The dimensions of the jig when all the components are fitted and held is such that the annular space between them defines the required coil dimensions. Allowance may be made for the placement of additional fibreglass sheet strip spacers within this region, which may allow two or more pressings of a coil with the addition of an outer layer of insulation between the pressings. Such spacers may be located around the bobbin 12 and on the side plates 14 and 16.

The lower side plate 14 includes a recess 28 in one area. This recess 28 corresponds to the section of the coil that incorporates the electrical lead-outs. An aluminium former 29 is inserted into the recess 28. This former 29 has slots 30 that follow the shape of, but are slightly larger than, the lead-out tags, and is constructed such that, when it is in position, the slots 30 press form the electrical insulation around the lead-outs during the pressing process.

The bobbin 12, side plates 14 and 16 and outer compression segments 20 in this embodiment are made from steel, but other suitable materials may also be used.

A method of forming a coil according to an embodiment of the present invention will now be described using the jig 10 of FIG. 1.

The main part of the jig 10, including bobbin 12 and lower side plate 14 is bolted onto a rotating table, such that it rotates in either the vertical or the horizontal plane. The two halves 14a and 14b of the lower side plate are bolted in their open position and the filler elements 24 placed in the gaps.

Packing material (typically sacrificial fibre glass strips or other spacers) are wrapped around bobbin 12 and mylar release film is layered in strips on the surface which define the winding area of the jig 10.

Figure 2:
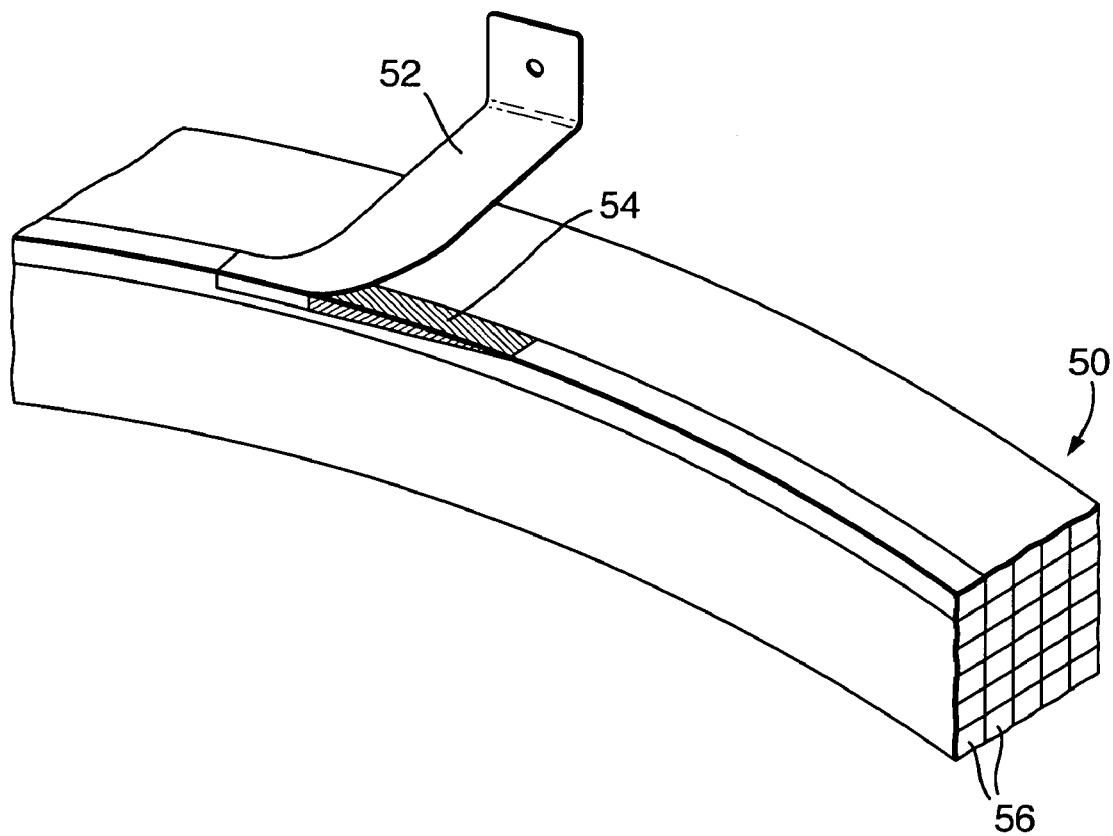
FIG. 2 shows a partial section of a coil according to an embodiment of the present invention.

The free end of a wire conductor 56 is terminated to a lead-out tag 52 (see FIG. 2, which shows a partial section of a coil 50 made on the jig 10). The wire conductor 56 has a covering of curable electrical insulating material, and the end portion of the tag 52 where it joins the wire 56 also has a curable insulating wrap. Other parts of the tag 52 may be similarly wrapped.

The lead-out tag 52 is located in its position in the jig 10 by laying it into the slot 30 in the aluminium former 29. Pins (not shown) in the jig 10 and/or other location features ensure that the tag 52 is in the correct position and orientation.

The jig 10 is rotated and the wire is wrapped around the bobbin for the required number of turns and layers. The wire is kept under significant tension during the winding process and this tension is not released when the requisite number of turns have been made.

The lead-out tags 52 are made from solid copper, and it is preferable that the possibility of the wires being pinched against these is avoided. One way of achieving this is shown in the embodiment of FIG. 2. Shaped "ramps" 54 of solid insulating material are inserted into the coil 50 during its build-up to guide the wires 56 around the sharp and hard edges of the lead-out tags 52 that are embedded in the coil windings.

The other end of the wire 56 is terminated to a second lead-out tag (not shown), which is also located in the jig 10, as before.

For a multi-winding coil, the second winding is now added in the same way on top of the first. Preferably a layer of additional interlayer insulation is first wrapped over the first winding.

In multi-winding coils, successive windings are contra-wound with respect to the immediately preceding winding. This reduces the requirements for interlayer insulation for the coil as a whole as the successive windings lie with the coil "starts" against each other and the coil "finishes" against each other, which reduces the voltage stress in those regions. Reduction of the amount of interlayer insulation improves the overall thermal characteristics of the coil and may also allow a greater amount of wire to be used in a given dimension of coil.

Additional liquid epoxy resin may be added with the interlayer insulation. For example, liquid resin and insulating flock (e.g. absorbent glass wool) may be added in regions that are prone to voidage after compression of the coil. This ensures that the overall coil build up is resin rich and reduces or eliminates voids in the completed coil.

When all the windings of the coil are completed, the upper plate 16 is bolted to the bobbin 12, providing compression along the axis of the coil. The outer compression segments 20 are inserted into the jig 10 and bolted down by radial bolts (not shown) to provide radial compression, a strip of sacrificial insulation material being first wrapped around the outer periphery of the coil to bridge the gaps between adjacent compression segments and prevent extrusion of material into the gaps.

In an alternative method of preparing the coil, the two halves 14a and 14b of the lower side plate are completely or partially closed up prior to wrapping the wire around the bobbin. After the winding operation is completed, the outer compression segments 20 are loosely bolted into place. The jacking devices 26 are then used to expand the two halves of the lower side plate apart, stretching the coil to the final diameter. In this way a tendency can be avoided for the relatively loosely wound wires to kink when radially compressed from the outside.

The coil is cured by placing the jig in an oven 99, as shown in FIG. 1. Alternatively, such a jig may have integral electrical heating means, which may be used in the curing process instead of placing the jig in an oven. For a typical TFM coil, the curing process might be performed at 150° C. for 8 hours.

Once the coil is cured, the coil is removed from the jig 10. First the outer compression segments 20 are removed, then the upper plate 16 is removed. The bolted bars 22 are released, the filler elements 24 removed and the jacking devices 26 used to close the two halves 14a and 14b of the lower plate 14 together. The pressed and cured coil can then be removed from the bobbin 12.

If it is desired to add a further layer of insulation to the outside of the coil, then the following steps may be carried out.

The coil is allowed to cool, and then outer wrappings of insulation and semiconductive ground plane are applied.

The spacers or other packing material used in the first pressing stage are removed from the jig 10, and may be replaced by smaller spacers, or omitted entirely.

With the two halves 14a and 14b of the lower plate 14 still in the closed position, the coil is replaced onto the jig 10. The jacking devices 26 are then used to separate the halves 14a and 14b, thereby applying radial compression to the inner surface of the coil. The filler elements 24 are replaced and the bolted bars 22 secured again.

The upper plate 16 is bolted to the inner surface again, thereby applying axial compression to the upper and lower surfaces of the coil. Finally the outer compression elements 20 are added to provide radial compression to the outer surface of the coil.

The additional insulation is then cured by heating, either in an oven or using the integral electrical heating means.

Once cured, the completed coil can be removed from the jig 10 as described previously.

The use of spacers or packing material can be reduced or eliminated by selection of the jig dimensions, or by the construction of two jigs of slightly different sizes. The latter is more convenient for volume production.

Figure 3:
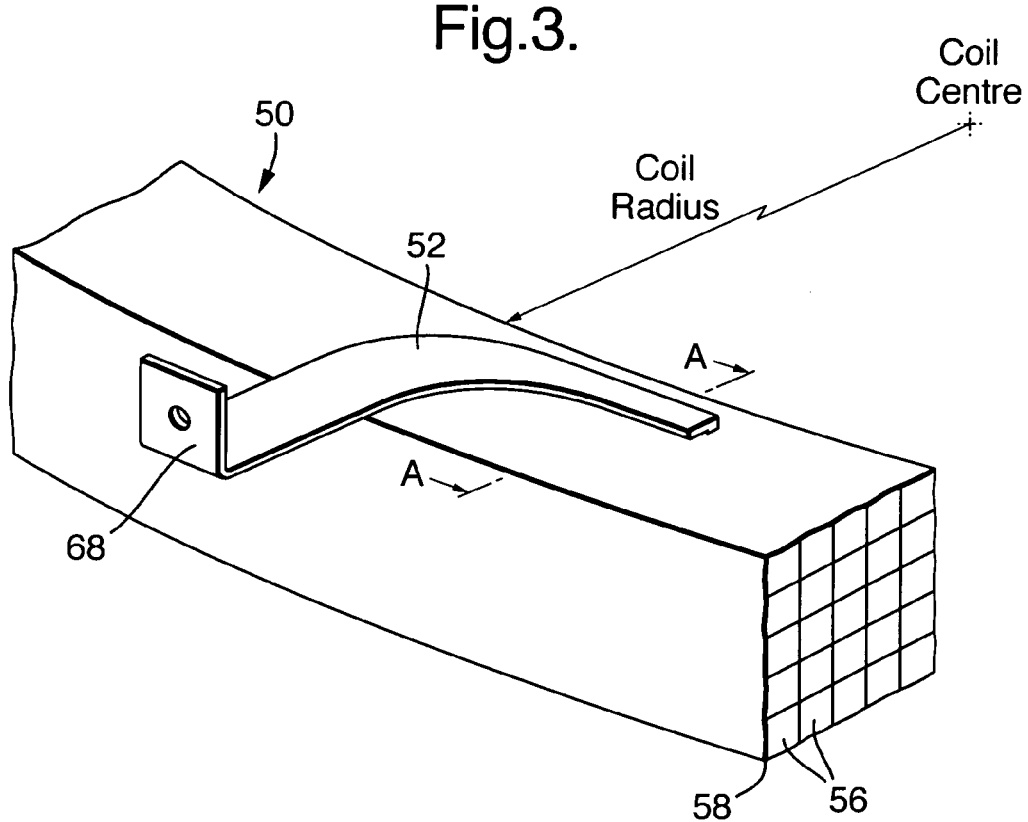
FIG. 3 shows a partial section of a coil according to an embodiment of the present invention.

FIG. 3 shows a section of a coil 50 according to an embodiment of the present invention. The coil has a copper lead-out 52 which is shown, for clarity, without the outer insulation wrap applied.

Figure 4:
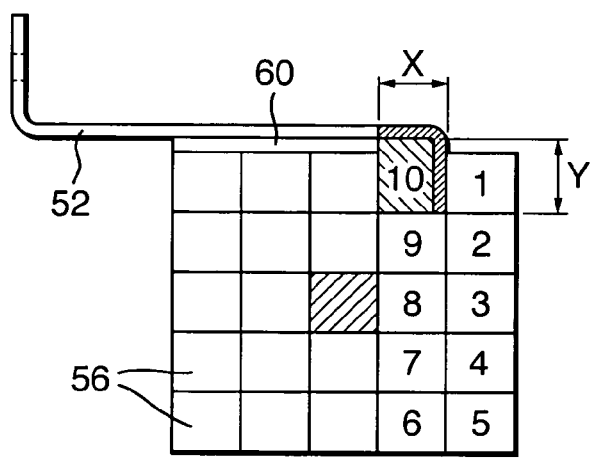
FIG. 4 shows a cross section of the coil of FIG. 3 along the line marked A-A.

FIG. 4 shows a cross-section of the coil of FIG. 3 along the line A-A, which is at the point where the connection between the lead-out 52 and a wire from the coil 50 is made.

The joint region between the lead-out and the wire is designed such that the joint width X is equal to the width of the coil conductors or wires 56 in the coil. This results in a narrowing of the wire in the X dimension at the joint region. However, the wire is manipulated to have an increased Y dimension at the joint region, so that the cross-sectional area for the wire is not reduced.

If the wire material is stranded copper cable (e.g. Litz wire), this can easily be shaped to the desired cross-section local to the joint. This leaves the lead-out 52 standing proud of the upper surface of the coil 50, and the space between the lead-out 52 and the upper surface is filled with additional layers of epoxy impregnated insulation material 60. This additional insulation material 60 is desirable as the lead-out 52 crosses other turns within the coil. These turns may be separate windings from that to which the lead-out 52 is connected and therefore at different voltages. In high frequency operation, such as that used by inverter drives, significant voltage differences can also exist between different turns of the same winding.

Figure 5:
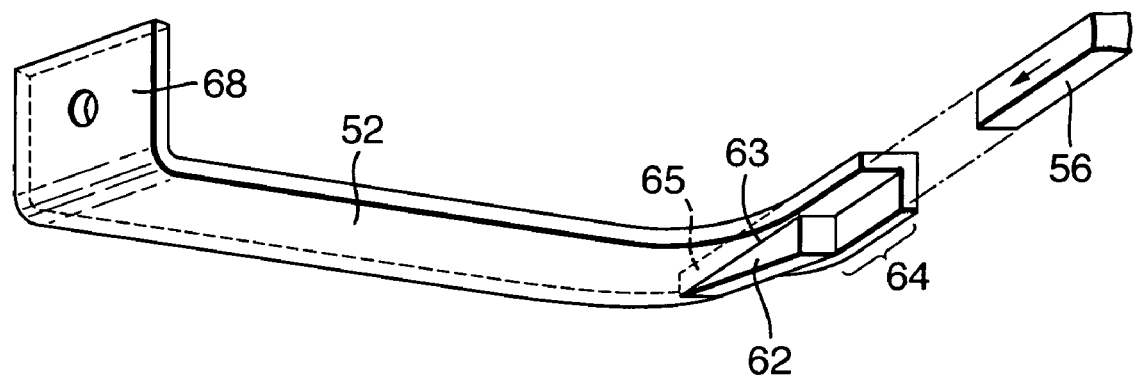
FIG. 5 shows a lead-out of a coil according to an embodiment of the present invention.

FIG. 5 shows a lead-out 52 prior to connection to a conductor or wire 56, viewed from "below". The detail of the connection between the lead-out 52 and the wire 56 can be seen. A solid copper wedge 62 is brazed onto the lead-out 52 at the end of socket region 64 which receives the wire. At its thick end the wedge has the same cross-sectional area as the wire. The curvature of the lead-out is arranged such that the cross-section (shaded area 65 in FIG. 5) of the lead-out at the "upper" and radially outer edge 63 of this wedge is at least equal to the cross-section of the wire 56. Overall, as the copper wedge thickness decreases, the width of the lead-out increases to keep the total cross-sectional area in the joint region constant or increasing, whereby local increases in the current density and hence potential "hot spots" can be avoided.

Referring to FIG. 4, the numbered wires 1-10 represent the turn numbers for a two layer winding of ten turns. The coil is wound onto the bobbin starting with a lead-out (not shown) connected to the wire at turn 1. The wire is helically wound onto the bobbin in a first layer, the helical winding progressing in the downwards direction of FIG. 4, until turn 5. Turn 6 is then wound on top of turn 5 of the first layer forming the first turn of the second layer. The wire is then helically wound on top of the earlier turns in a second layer, the helical winding for this layer progressing in the upwards direction of FIG. 4. Eventually turn 9 rises to the "upper" surface to become turn 10 which is connected to lead-out 52.

The solid copper wedge 62 allows smooth transition of the wire in the layer below the connection to rise to the surface as the coil is wound without passing a sharp edge which could damage the insulation. Thus, in this embodiment, a separate piece of insulator material, e.g. a shaped "ramp" 54 (see FIG. 2) may not be needed to guide the next layer of the wire past the connection region.

Figure 6:
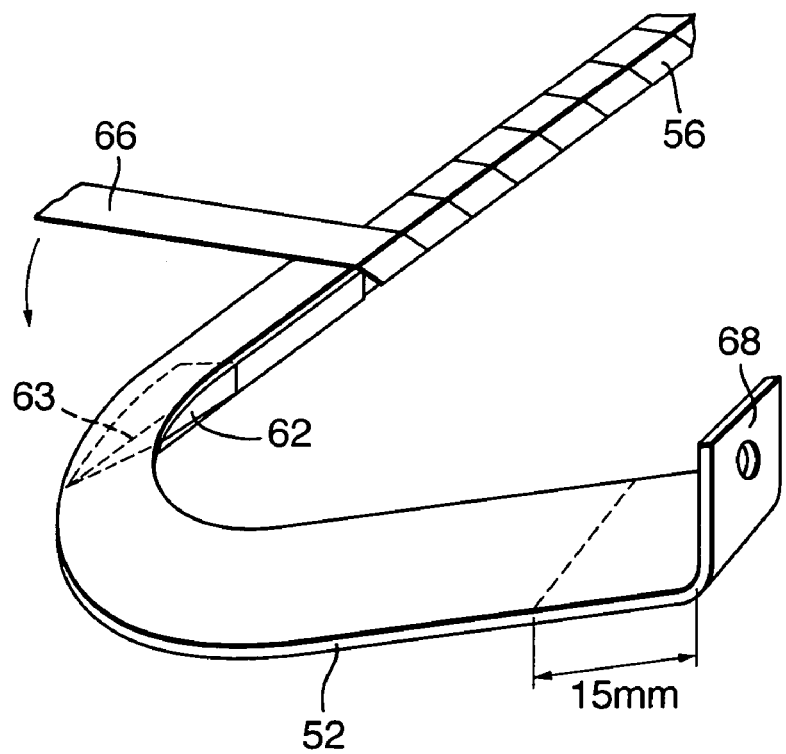
FIG. 6 shows a lead-out of a coil according to another embodiment of the present invention.

After the wire 56 is connected to the lead-out 52, epoxy loaded insulating tape 66 is wrapped around the wire and continues over the lead-out 52 as shown in FIG. 6. The wrap continues to a point approximately 15 mm from the connection tab 68. Where the tape wrap 66 has to cover a re-entrant part of the lead-out 52, in the region of the copper wedge 62, it may be glued (e.g. using cyano-acrylate adhesive) to the lead-out 52 during the winding process to reduce or eliminate air pockets.

Generally, the first end of each wire is joined to its lead-out before winding, and the second end after winding.

The second end is terminated by first determining the location of the end with the wire wound at the correct tension. That location is marked, the coil is unwound a part turn, and the wire is clamped to maintain tension in the winding while the end is cut and terminated. The wire is then rewound, with the lead-out being located into the jig to maintain the tension.

The lead-outs are located and held in their correct positions during winding of the coil by the aluminium former 29 shown in FIG. 1. The jig 10 ensures that the lead-outs are bonded into the coil structure during the first pressing and curing stage. After the first pressing and curing stage, when the coil is removed from the jig 10 and an additional layer of insulation and a ground plane semiconductor layer are wound around it, the lead-outs are included in this overall wrapping, although the additional insulation layer is not taken further than the insulation wrap 66 already applied prior to the first pressing stage. The ground plane wrap is taken no further than 10 mm from the end of the second stage insulation layer such that the insulation layer always extends beyond the ground plane layer. During the second heating and pressing of the coil the lead-outs therefore become fully integrated with the coil as they lie within the outer insulating layers.

The method of connecting the lead-out 52 to the coil wire 56 described above is only one possible method. Other methods which accomplish the transition between wire 56 and lead-out 52 within the width of the wire, thereby avoiding radial bulges or insulation pressure points within the fully pressed coil fall within the present invention.

Connection of the lead-outs 52 to the power source can be accomplished by standard means, for example using a flying lead which is bolted to the connection tab 68.

The lead-out 52 shown in FIGS. 2-6 is also purely exemplary. Other shapes of lead-out which allow the above features to be achieved are also envisaged. However, it is preferable that the shape allows the insulation wrap 66 from the wire 56 to be continued over the lead-out. Generally, the insulation wrap is not particularly elastic, so smoothly varying shapes are preferred over e.g. sharp corners or changes of direction which can be difficult to wind the wrap around without causing kinks or tears in the wrap, or producing air pockets or general looseness.

In the embodiment of FIG. 5, the wedge 62 is shown attached to the lead-out 52 prior to connection to the wire 56. In an alternative embodiment, the wedge 62 may be formed from the material of the wire 56, prior to attachment of the lead-out 52, and then connected to the lead-out along with the other portions of the wire 56 in the connection region, for example by brazing.

If the wire 56 is stranded, then it can be impregnated with silver solder or braze to form a solid block for the wedge. A taper can then be formed, after joining to the lead out by soldering, by filing away the excess material. It is important that the fill material used to form the wedge should be a higher melting point than the material, used to form the joint. Otherwise the filler may flow out of the wedge during the jointing operation.

Although the aspects and embodiments of the present invention have been described with particular reference to TFMs, other applications also fall within the scope of the invention. In particular, electrical equipment which operates at high altitude, or in other low pressure environments is susceptible to corona discharge at lower voltages than would be relevant at ground or sea level.

We claim:

1. A coil winding jig comprising:
   a bobbin having a winding surface onto which a coil is windable,
   axial compression means for axially compressing non-straight section or sections of the coil, and
   radial compression means for radially compressing non-straight section or sections of the coil wherein the radial dimension of the bobbin is adjustable to facilitate removal of the coil from the bobbin.

2. A coil winding jig comprising:
   a bobbin having a winding surface onto which a coil is windable,
   axial compression means for axially compressing non-straight section or sections of the coil, and
   radial compression means for radially compressing non-straight section or sections of the coil wherein the axial compression means comprises axially spaced side plates to the bobbin, whereby the end faces of the coil can be pressed between the side plates.

3. A coil winding jig according to claim 2, wherein at least one of the side plates has recesses for accommodating lead-outs from the coil.

4. A coil winding jig comprising:
   a bobbin having a winding surface onto which a coil is windable,
   axial compression means for axially compressing non-straight section or sections of the coil, and
   radial compression means for radially compressing non-straight section or sections of the coil wherein the radial compression means comprises a plurality of compression segments which are positionable around the circumferences of the bobbin, whereby the coil can be pressed between the compression segments and the winding surface of the bobbin.

5. A coil winding jig according to claim 1, further comprising heating means for heating the coil.

* * * * *